Patented May 2, 1939

2,156,595

UNITED STATES PATENT OFFICE 2,156,595

METHOD FOR MANUFACTURING CALCIUM ARSENATE

Axel Rudolf Lindblad, Stockholm, and Anders Gustav Paul Palén, Saltsjobaden, Sweden, assignors to Bolidens Gruvaktiebolag, Stockholm, Sweden, a joint-stock company of Sweden No Drawing. Application November 18, 1937, Serial No. 175,340. In Sweden September 9, 1937

1 Claim. (Cl. 23—53)

It is well known that calcium arsenate is an important insecticide, used as a protection against insect pests on certain cultivated plants, for instance cotton.

The usual method of manufacturing calcium arsenate is to let arsenic acid react with slacked lime in a suspension in water. As raw material one must therefore use arsenic acid, which is produced by oxidizing arsenous acid with nitric acid or alkali chlorate. The usual method is to use nitric acid, but this requires very expensive plants.

The present invention relates to an important and simplified way of manufacturing calcium arsenate, in which the oxidation of the arsenous acid to arsenic acid takes place directly in connection with the formation of calcium arsenate in a single process. In this invention the oxidizing agent consists of calcium nitrate, preferably in a cheap form such as "Norway salpeter" (a synthetic calcium nitrate, made from atmospheric nitrogen and extensively used as fertilizer). The calcium nitrate is mixed with arsenous acid and calcium oxide or other suitable calcium compounds in proper proportions to produce a calcium arsenate of suitable composition. The ingredients are mixed thoroughly and heated. A reaction takes place whereby arsenous acid is oxidized by the nitric acid in the calcium nitrate to arsenic acid which combines with the lime to calcium arsenate, for instance according to the following formula:

If for instance a mixture of 5 parts by weight of calcium nitrate, 6 parts by weight of arsenous acid and 4 parts by weight of calcium oxide are mixed and heated, a product with 44% $As_2O_5$ is produced free from 3-valent As.

In order to produce a calcium arsenate of desired composition the calcium nitrate, arsenous acid and calcium oxide or other suitable calcium compounds can be used in varying proportions.

Using the following molecular proportions

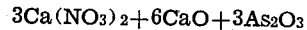

the product contains 48.4% $As_2O_5$ and with

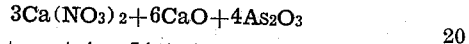

the product contains 54% $As_2O_5$.

Having thus described our invention we declare that what we claim is:

The method of preparing calcium arsenate comprising the step of heating a substantially dry mixture of arsenic trioxide, calcium nitrate and calcium oxide.

AXEL RUDOLF LINDBLAD.
ANDERS GUSTAV PAUL PALÉN.